(12) United States Patent
Fredberg et al.

(10) Patent No.: US 7,560,400 B2
(45) Date of Patent: Jul. 14, 2009

(54) RADOME WITH POLYESTER-POLYARYLATE FIBERS AND A METHOD OF MAKING SAME

(75) Inventors: Marvin I. Fredberg, Stoughton, MA (US); Peter H. Sheahan, Groton, MA (US); Sharon A. Elsworth, Mason, NH (US); Kaichang Chang, Northboro, MA (US)

(73) Assignee: Raytheon Company, Waltham, MA (US)

( * ) Notice: Subject to any disclaimer, the term of this patent is extended or adjusted under 35 U.S.C. 154(b) by 644 days.

(21) Appl. No.: 10/620,884

(22) Filed: Jul. 16, 2003

(65) Prior Publication Data

US 2005/0014430 A1    Jan. 20, 2005

(51) Int. Cl.
*B32B 3/26* (2006.01)
(52) U.S. Cl. .............................. 442/246; 343/872
(58) Field of Classification Search ................ 428/34.1, 428/34.5, 34.6, 34.7, 35.7, 35.9, 36.1, 36.2, 428/36.3, 36.4, 36.9, 36.91, 36.92, 292.1, 428/295.1, 296.7, 300.4; 442/59, 104, 107, 442/110, 117, 131, 132, 133, 170, 246, 248, 442/251, 261, 286, 304, 318, 394; 250/332, 250/335, 522.1, 506.1, 505.1; 52/83; 343/872, 343/909, 911 R
See application file for complete search history.

(56) References Cited

U.S. PATENT DOCUMENTS

| | | | |
|---|---|---|---|
| 4,506,269 A | 3/1985 | Greene | |
| 5,207,474 A | 5/1993 | Licher et al. | |
| 5,275,877 A | 1/1994 | Isayev | |
| 5,357,726 A * | 10/1994 | Effenberger et al. | ....... 52/309.7 |
| 5,360,503 A | 11/1994 | Coffy | |
| 6,074,722 A * | 6/2000 | Cuccias | ...................... 428/107 |
| 6,107,976 A | 8/2000 | Purinton | |
| 6,117,555 A | 9/2000 | Fujimori et al. | |
| 6,998,165 B2 * | 2/2006 | Howland | ..................... 428/105 |
| 2004/0151865 A1* | 8/2004 | Howland | ..................... 428/58 |
| 2006/0068158 A1* | 3/2006 | Howland | ..................... 428/105 |

FOREIGN PATENT DOCUMENTS

| | | |
|---|---|---|
| JP | 02010901 | 1/1990 |
| JP | 02070102 | 3/1990 |
| JP | 02070102 A | 3/1990 |
| JP | 05071152 | 6/1995 |
| JP | 08276441 | 10/1996 |
| JP | 11217790 A | 8/1999 |
| JP | 20001169558 A | 6/2000 |
| JP | 2003092220 A | 3/2003 |
| WO | WO 94/11185 | 5/1994 |
| WO | WO 95/18881 A1 | 7/1995 |
| WO | WO 2004/072359 A2 | 8/2004 |

OTHER PUBLICATIONS

U.S. Appl. No. 10/621,155, filed Jul. 16, 2003, Fredberg et al.
Decision on Appeal, Appeal No. 2007-1889 Decided Nov. 29, 2007 re U.S. Appl. No. 10/621,155 (9 pages total).

* cited by examiner

*Primary Examiner*—Arti Singh
(74) *Attorney, Agent, or Firm*—Iandiorio Teska & Coleman

(57) ABSTRACT

A radome comprising flexible composite fabric material including polyester-polyarylate fibers in a flexible resin matrix material.

35 Claims, 3 Drawing Sheets

RADOME WITH POLYESTER-POLYARYLATE FIBERS AND A METHOD OF MAKING SAME

GOVERNMENT RIGHTS

This invention was made with U.S. Government support under Contract No. HQ 006-01-C-001 (Prime) 100217 (Sub) by the Ballistic Missile Defense Organization of the Department of Defense. The Government may have certain rights in the subject invention.

RELATED APPLICATIONS

This application is related to the U.S. patent application Ser. No. 10/621,155 entitled RIGID RADOME WITH POLYESTER-POLYARYLATE FIBERS AND A METHOD OF MAKING SAME, filed on Jul. 16, 2003 now abandoned and which is hereby incorporated herein by reference.

FIELD OF THE INVENTION

This invention relates to a high strength flexible radome reinforced with polyester-polyarylate fibers which reduce radio frequency transmission losses while at the same time providing high strength.

BACKGROUND OF THE INVENTION

Air-supported flexible fabric radomes for radar or communications antennas serve as protection from wind, thermal distortions, sunlight, rain, snow, ice, hail, sand, dust and other elements.

For approximately twenty years, the common material used for flexible membrane radomes has been a polytetrafluoroethylene (PTFE) fiberglass composite fabric. While somewhat successful, existing radomes are susceptible to very significant loss of mechanical strength due to creasing and flexing during the manufacturing process and transportation, aging damage due to environmental conditions, as well as stress ruptures or fabric tears when exposed to high loads. These limitations are due in significant part to the material properties of the fiberglass reinforcement used in the fabric construction. Fiberglass as the fiber reinforcement is subject to loss of mechanical strength from fiber-to-fiber abrasion, creasing, folding, and creep rupture. For high survivability applications, a safety margin is required to account for these potential effects. Heavily constructed composite fabrics with large glass fiber bundles become necessary. A heavier construction, however, increases radio frequency (RF) transmission losses decreases receiving sensitivity, and thus requires an increase in the transmission power or the size of radar and communication antennae, at a great cost. Furthermore, practical limitations in the fabric weaving process limit fabric thickness and thus, structural capability. The net result, when all fabric properties are considered, is that product survivability under extreme environmental conditions is not assured. Consequently, compromises between RF performance, structural integrity, and survivability are required.

Using known materials and methods, studies have been performed to investigate increasing the fiber weave density and significant progress has been made. However, poor damage tolerance as experienced in crease fold, flex fold, hydrostatic drum burst tests, and creep rupture failure tensile tests, has demonstrated the need for higher strength damage tolerant reinforcements with suitable radio frequency (RF) transmission characteristics. Significant structural analysis using wind tunnel measurement data and non-linear finite element modeling supports the need for higher strength and strength retention in the radome material. In summary, prior art flexible membrane radomes with high strengths would result in unacceptable radio frequency (RF) losses while the radomes with acceptable RF losses are not generally strong enough in many environments.

BRIEF SUMMARY OF THE INVENTION

It is therefore an object of this invention to provide a higher strength flexible radome with reduced radio frequency (RF) transmission losses, and increased RF receiving sensitivity.

It is a further object of this invention to provide such a high strength flexible radome with demonstrated capability to withstand creep rupture, crease damage, flex damage, abrasion, as well as prolonged periods of high stress exposure.

It is a further object of this invention to provide such a high strength flexible radome which does not require significant knock-down factors (allowances in required fabric strength for deterioration in mechanical properties) as compared to known materials, such as fiberglass.

It is a further object of this invention to provide such a high strength flexible radome that reduces the power requirements and the cost of the antenna or communications systems protected by the radome.

The invention results from the realization that a high strength flexible radome with low RF loss and high structural integrity and survivability is achieved by utilizing polyester-polyarylate fibers in the radome in place of fiberglass or other currently known or used materials.

This invention features a radome including flexible composite fabric material having polyester-polyarylate fibers in a flexible resin matrix material. The polyester-polyarylate fibers may be woven or knitted, and the flexible resin matrix may be a polyurethane resin. The radome may further include an outer skin or hydrophobic exterior covering bonded to the flexible composite fabric material, and the skin may be comprised of polytetrafluoroethylene (PTFE), fluorinated ethylene propylene (FEP) or perfluoroalkoxy resin (PFA). The polyester-polyarylate fibers may have a length of several hundred feet. The polyester-polyarylate fibers may form yarns, and the yarns may be woven or knitted. There may be one or more plies of flexible composite fabric material.

This invention further features a radome including a flexible composite material having polyester-polyarylate fibers woven in a flexible resin matrix material, and a radome including a flexible composite material having polyester-polyarylate fibers knitted in a flexible resin matrix material.

This invention further features a method of producing a radome, the method comprising combining polyester-polyarylate fibers with a flexible resin matrix material to form a flexible composite fabric material. The polyester-polyarylate fibers may be woven or knitted. The flexible resin matrix may be a polyurethane resin. The method may further include bonding a skin to the flexible composite fabric material. The skin may be comprised of polytetrafluoroethylene (PTFE), fluorinated ethylene propylene (FEP), or perfluoroalkoxy resin (PFA). The skin may be bonded to the flexible composite fabric material by chemical etching, by corona treatment combined with adhesive bonding, by lamination, or by melt processing. The method may further include forming plies of flexible composite fabric material.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
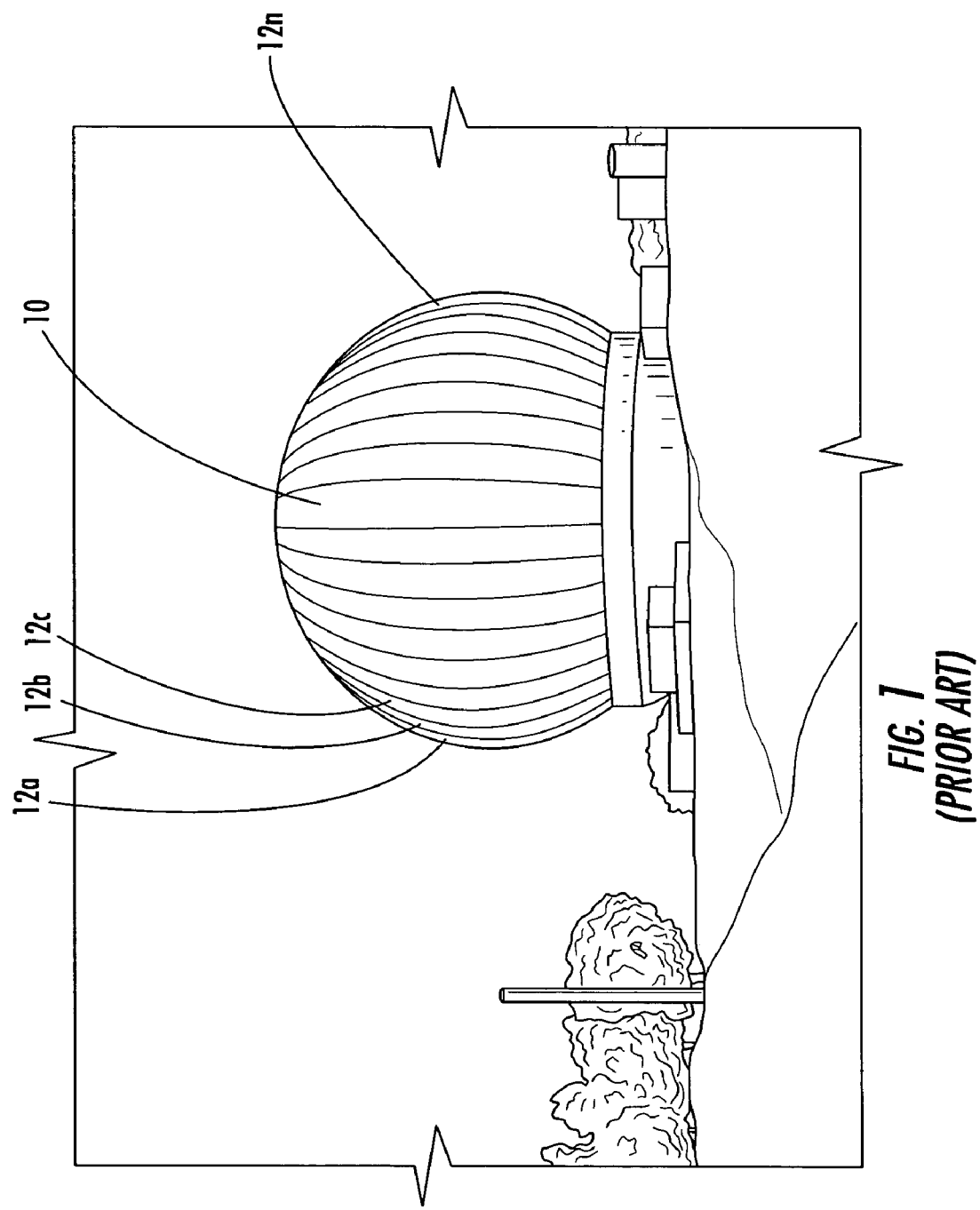
FIG. 1 is a schematic view of a typical air supported ground-based radome with a flexible fabric membrane covering.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Fabric radomes are commonly used to provide environmental protection for antenna and communications equipment. Typical currently known fabric radomes including air-supported radome 10, FIG. 1 and stretched membrane radomes (not shown), are made of polytetrafluoroethylene (PTFE) fiberglass composite fabric sections 12a-12n which suffer a loss of mechanical strength during manufacturing, transport, and aging, caused by creasing, flexing, creep rupture and exposure to environmental conditions as explained in the Background section above. To compensate for these deficiencies, it is known to increase the fiberglass thickness. However, this increase results in increased RF losses. Furthermore, practical limitations in the fabric ply weaving process limit fabric thickness.

The subject invention solves these shortcomings through the use of a flexible composite fabric radome material having polyester-polyarylate fibers which provide increased strength and decreased RF transmission loss. A polyester-polyarylate radome in accordance with this invention provides adequate strength and may incorporate a hydrophobic exterior covering with a low dielectric constant, producing a reduction in RF loss as compared to known materials such as polytetrafluoroethylene (PTFE) fiberglass. Polyester-polyarylate fibers in place of known materials also allow for a reduction of total fabric thickness and provides low moisture absorption, further contributing to a reduction in RF loss.

For minimum RF losses, it is advantageous for the radome membrane fabric material to have a low dielectric constant and loss tangent, and to be of minimum thickness. In RF transmission measurement testing, a polyester-polyarylate fiber reinforced fabric composite demonstrated excellent electrical properties including a low dielectric constant and low loss tangent. Additionally, the polyester-polyarylate fiber reinforced composite has characteristics of low water absorption which further minimizes RF transmission loss in long term humid environments.

Figure 2:
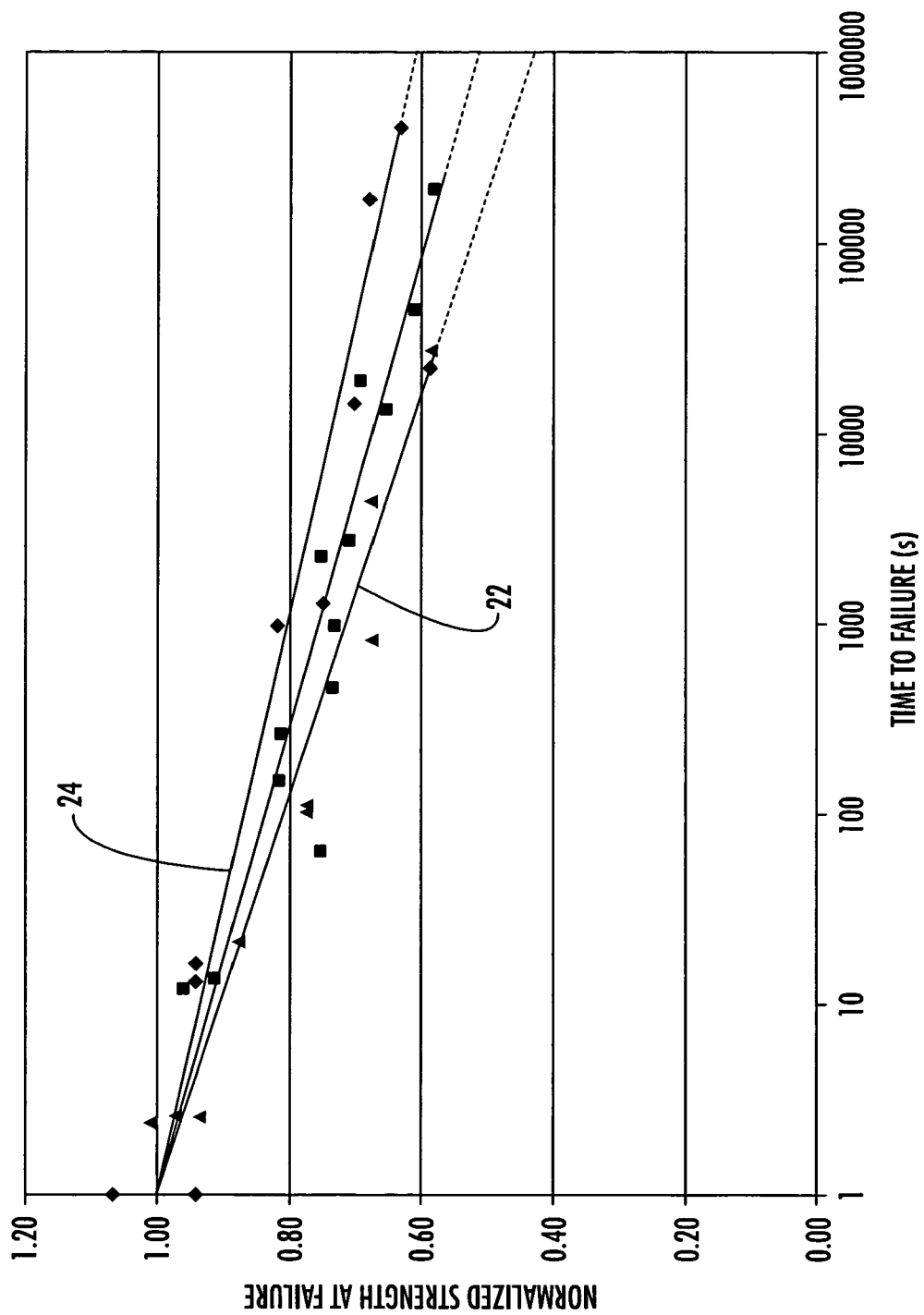
FIG. 2 is a graph showing a comparison between load durability for fiberglass fibers and polyester-polyarylate fibers.

The fiber strength for polyester-polyarylate fibers is 412 Msi as compared to 500 Msi for glass. Material knock down factors (factors for the reduction in properties due to a specific event, exposure, or characteristic) to be considered include: factors for aging; crease and fold damage; bi-axial stress state; load duration; tear resistance; environmental exposure; internal fiber abrasion; creep rupture tolerance; fiber corrosion; and, depending on the specific fiber, other possibilities. Polyester-polyarylate fibers have superior performance as compared to glass for almost all above mentioned factors coupled with a polyurethane resin system and exterior hydrophobic covering. The graph of FIG. 2 compares load durability for fiberglass fibers 22 and polyester-polyarylate fibers 24.

Hydrostatic drum burst tests further demonstrated the structural advantages to polyester-polyarylate as compared to fiberglass. One polyester-polyarylate sample was 0.033 inches thick compared to 0.053 inches thick for a fiberglass composite. In undamaged samples, the composite fabric of this invention measured 90% stronger than the glass composite. After damage by folding, the glass composite demonstrated a 42% strength retention (58% loss in strength) as compared to no strength loss for the polyester-polyarylate composite. A radome designed with polyester-polyarylate fibers in accordance with this invention has a statistically calculated reliability of 0.999 for a twenty year service life (roughly equating to a safety factor >5) including knock-downs for: wind load variations; environmental degradation (UV, moisture, temperature, load cycles); variable and sustained loading effects; fabric damage and crease fold damage; multi-axis loading conditions; and material property variations.

Figure 3:
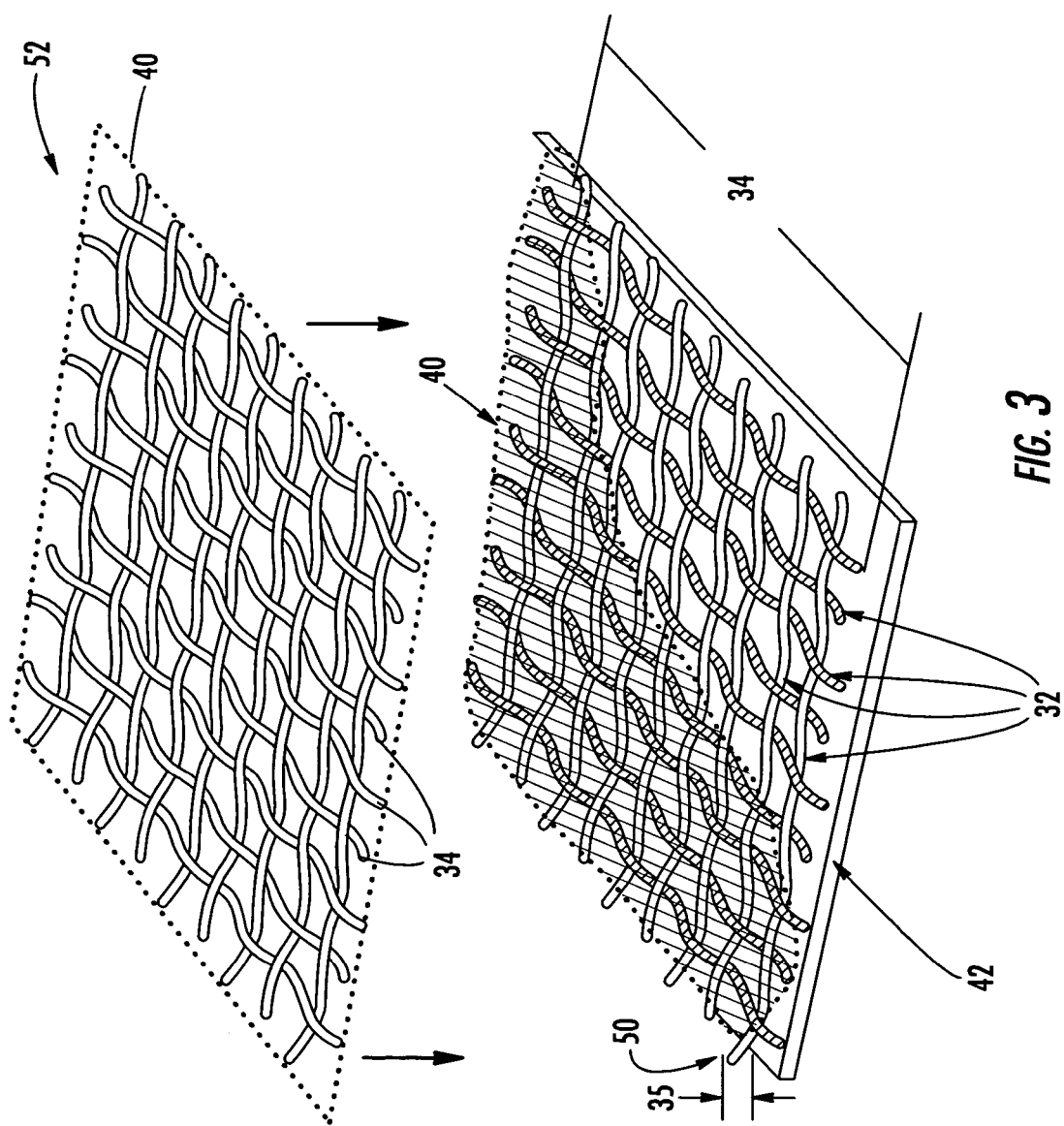
FIG. 3 is a schematic view of a section of a radome in accordance with this invention including polyester-polyarylate fibers.

The radome and method of producing the radome of the subject invention thus includes polyester-polyarylate fibers 32, FIG. 3, as the structural reinforcement in flexible composite fabric material 35 of the resulting radome. Polyester-polyarylate fibers 32 can be readily woven into fabric 34, as shown in FIG. 3, which may be cloth, and tailored to the needs of the specific application. Polyester-polyarylate fibers 32 may also be knitted into fabric 34 (not shown) as knitting of fibers is known in the art. In one example of the radome of this invention, fabric 34 is multi-axial (not shown). Fabric 34 is impregnated or coated with flexible resin matrix 40, which may be a polyurethane resin system, forming flexible composite fabric material 35. Flexible composite fabric material 35 may include one ply 50 of polyester-polyarylate fibers 32 in flexible resin matrix 40, or flexible composite fabric material 35 may include more than one ply. Typically, flexible composite fabric material 35 includes two plies 50, 52, including polyester-polyarylate fibers 32 in flexible resin matrix 40. Flexible composite fabric material 35 including polyester-polyarylate fibers 32 is further provided with an outer skin or hydrophobic exterior covering 42, which may be made up or comprised of fluorinated ethylene propylene (FEP), polytetrafluoroethylene (PTFE) or perfluoroalkoxy resin (PFA). The latter provides the same durable hydrophobic exterior surface characteristics as many commercially available radome fabrics. Bonding of hydrophobic exterior covering 42 to flexible composite fabric material 35 may be accomplished by chemical etching, corona treatment combined with adhesive bonding, lamination, melt processing or other techniques as are known in the art.

Polyester-polyarylate fibers 32 such as Vectran® fiber, made by Celanese Acetate LLP, may be used. In one example, fibers 32 have a length of several hundred feet and are from 200 to 5000 denier. Polyester-polyarylate fibers 32 may form yarns that may be woven or knitted into fabric 34 with varying fiber thread counts, as is known in the art. It will be further understood by those skilled in the art that the fibers may be combined to form yarn, and that reference to fibers or fiber orientation and the like herein refer equally to yarns comprised of fibers.

The subject invention thus results in a high strength flexible radome with reduced radio frequency (RF) transmission losses and increased RF receiving sensitivity. The radome fabric of this invention has the capability to withstand creep rupture, crease damage, flex damage, abrasion, as well as prolonged periods of high stress exposure. The flexible radome material does not have significant knock-down factors as compared to known materials such as fiberglass, and it reduces the power requirements or the antenna's size, as well as the cost of the antenna or communications systems protected by the radome. Low RF loss coupled with high structural integrity and survivability are achieved by utilizing polyester-polyarylate fibers in the radome fabric in place of fiberglass or other materials.

Although specific features of the invention are shown in some drawings and not in others, however, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A radome for providing environmental protection for radar and communications equipment, said radome comprising flexible composite fabric material including polyester-polyarylate fibers in a flexible resin matrix material structured to increase the radome strength and reduce radio frequency transmission losses through the radome.

2. The radome of claim 1 in which the polyester-polyarylate fibers are woven into fabric.

3. The radome of claim 1 in which the polyester-polyarylate fibers are knitted into fabric.

4. The radome of claim 1 in which the flexible resin matrix is a polyurethane resin.

5. The radome of claim 1 further including a skin bonded to the flexible composite fabric material.

6. The radome of claim 5 wherein the skin is comprised of polytetrafluoroethylene (PTFE).

7. The radome of claim 5 wherein the skin is comprised of fluorinated ethylene propylene (FEP).

8. The radome of claim 5 wherein the skin is comprised of perfluoroalkoxy resin (PFA).

9. The radome of claim 1 in which the polyester-polyarylate fibers have a length of several hundred feet.

10. The radome of claim 1 in which the polyester-polyarylate fibers form yarns.

11. The radome of claim 10 in which the yarns are woven.

12. The radome of claim 10 in which the yarns are knitted.

13. The radome of claim 1 in which the flexible composite fabric material is comprised of one ply.

14. The radome of claim 1 in which the flexible composite fabric material includes more than one ply.

15. The radome of claim 2 in which the fabric is multi-axial.

16. The radome of claim 3 in which the fabric is multi-axial.

17. A flexible fabric radome comprising flexible composite material including polyester-polyarylate fibers woven in a flexible resin matrix.

18. A flexible fabric radome comprising flexible composite material including polyester-polyarylate fibers knitted in a flexible resin matrix.

19. A method of producing a flexible fabric radome which provides environmental protection for radar and communications equipment, the method comprising:
combining polyester-polyarylate fibers with a flexible resin matrix material to form a flexible composite fabric material.

20. The method of claim 19 in which the polyester-polyarylate fibers are woven into fabric.

21. The method of claim 19 in which the polyester-polyarylate fibers are knitted into fabric.

22. The method of claim 19 in which the flexible resin matrix material is a polyurethane resin.

23. The method of claim 19 further including bonding a skin to the flexible composite fabric material.

24. The method of claim 23 wherein the skin is comprised of polytetrafluoroethylene (PTFE).

25. The method of claim 23 wherein the skin is comprised of fluorinated ethylene propylene (FEP).

26. The method of claim 23 wherein the skin is comprised of perfluoroalkoxy resin (PFA).

27. The method of claim 23 wherein the skin is bonded to the flexible composite fabric material by chemical etching.

28. The method of claim 23 wherein the skin is bonded to the flexible composite fabric material by corona treatment combined with adhesive bonding.

29. The method of claim 23 wherein the skin is bonded to the flexible composite fabric material by lamination.

30. The method of claim 23 wherein the skin is bonded to the flexible composite fabric material by melt processing.

31. The method of claim 19 further including forming plies of flexible composite fabric material.

32. The method of claim 20 in which the fabric is multi-axial.

33. The method of claim 21 in which the fabric is multi-axial.

34. An air-supported flexible fabric or stretched membrane radome for providing environmental protection for radar and communications equipment, said radome comprising flexible composite fabric material including polyester-polyarylate fibers in a flexible resin matrix material.

35. A radome for providing environmental protection for antennae and communications equipment, said radome comprising:
a flexible composite fabric material including polyester-polyarylate fibers forming yarns woven or knitted into fabric in a flexible resin matrix material; and
an outer hydrophobic exterior covering bonded to the flexible composite fabric material.

* * * * *